United States Patent Office 2,946,826
Patented July 26, 1960

2,946,826

STABILIZATION OF HALOHYDROCARBONS

George Whitlock Graham, Beloeil Station, Quebec, and George Russell Lusby, St. Hilaire Station, Quebec, Canada, assignors to Canadian Industries Limited, Montreal, Quebec, Canada, a corporation of Canada No Drawing. Filed May 13, 1959, Ser. No. 812,809

Claims priority, application Canada May 16, 1958

4 Claims. (Cl. 260—652.5)

This invention relates to the stabilization of halohydrocarbons. More particularly, it relates to the inhibition of halohydrocarbon decomposition as encountered in metal degreasing.

It is known that chlorohydrocarbons such as trichloroethylene, when exposed to air, light and heat, decompose by oxidation with the formation of phosgene, hydrogen chloride and chloroacetic acids. Several types of stabilizers are commonly used to inhibit the decomposition of chlorohydrocarbons by oxidation. However, in metal degreasing, when the solvents are often subjected to higher temperatures, chlorohydrocarbons can also undergo a condensation-type decomposition to form hydrochloric acid together with a resinous material. In the presence of aluminum or iron, the hydrochloric acid formed by either type of decomposition reacts with these metals to form the chloride salts which act as catalysts for the condensation reaction. Thus, when the condensation reaction takes place in a metal degreaser where the chips of these metals are often heaped in the boiling solvent, it often become autocatalytic, i.e., where aluminum is present the hydrochloric acid forms aluminum chloride which decomposes more chlorohydrocarbon to form more catalyst. When this occurs, the solvent decomposes very rapidly with the evolution of large quantities of hydrochloric acid and the formation of a tarry or gummy mass in the solvent.

Efforts have been made in the past to combat this type of decomposition of halohydrocarbons by addition of water to the solvent. This practice has only been partially successful primarily due to the low solubility of water in halohydrocarbons. Certain alcohols and phenols have also been used in this connection. However, the addition of such compounds increases the solubility of hydrochloric acid in halohydrocarbons and thus is undesirable in metal degreasing because of corrosion difficulties encountered.

There is much evidence which indicates that the rate of reaction between acids and commonly used unsaturated compounds added to halohydrocarbons is relatively slow and that, if an acid condition is once reached in a degreaser handling aluminum parts, only a compound which reacts almost instantaneously with hydrochloric acid can prevent serious trouble. The most effective method of preventing such occurrences, for instances, in the case of aluminum degreasing is to have an adequate reserve of stabilizers which accept acids rapidly, rather than relying on compounds which inhibit the aluminum reaction.

It is therefore an object of the present invention to provide new means whereby to inhibit halohydrocarbon decomposition by oxidation.

Another object of this invention is to provide new means whereby to prevent halohydrocarbon condensation-type decomposition which is catalyzed by the presence of metals such as aluminum, iron, etc.

A further object of this invention is to provide a new type of stabilizers for halohydrocarbons which will continuously and rapidly accept the acid liberated during the degreasing process without being corrosive to the metal parts in contact therewith.

A still further object of this invention is to degrease metal articles with chemically stable halohydrocarbons.

Other objects of this invention will become apparent hereinafter.

The present invention is based on the discovery that certain soluble salts of weak organic acids, in the presence of low boiling amines, inhibit the decomposition of halohydrocarbons when exposed to high temperatures, said decomposition being catalyzed by the presence of metals such as aluminum, iron, etc.

Broadly speaking, this invention thus provides a method of stabilizing halohydrocarbons against the formation of acidic products therein by incorporating therewith a mixture comprising a lower proportion of a low-boiling base and a higher proportion of a metal salt of a weak organic acid, the metal being selected from the group consisting of lead and metals of groups I($a$) and II of the periodic table, the said salt liberating the low-boiling base from its hydrochlorides or other acid salts.

The preferred salts which may be used in connection with the present invention are sodium, potassium, calcium, barium, strontium, magnesium, and zinc salts of naphthenic, stearic, palmitic and oleic acids.

Among the low-boiling bases suitable for the purpose of the invention there may be mentioned triethylamine, diisopropylamine, hydrazine hydrate, 1,1-dimethylhydrazine, etc. Triethylamine has been found the preferred suitable low-boiling amine because of its excellent antioxidant properties in the stabilization of halohydrocarbons such as trichloroethylene.

The concentration of the different salts in halohydrocarbons may vary within wide limits depending on the salt, the halohydrocarbon and the metal to be degreased. For example, a concentration of 0.01–1.0% by weight of a soluble stearate in trichloroethylene containing 0.0001–0.1% by weight of triethylamine has shown successful results.

The following examples will now illustrate the preferred embodiments of the invention, but in no way are they intended to limit the scope thereof.

EXAMPLE I 200 ml. of trichloroethylene containing 0.02% of triethylamine was treated with anhydrous HCl to convert the amine to its hydrochloride until the pH was reduced to 6.8. A quantity of calcium stearate (0.52 g.) equivalent to 3 times the amount of triethylamine present was then added and the mixture was refluxed for 1 hour. It was then distilled and three 50 ml. fractions of the distillate were collected and titrated. The results are given in the following table.

Table 1

|  | Initial pH | N/10 HCl required to titrate to pH 7.0 (ml. NCl/100 ml. of trichloroethylene) |
|---|---|---|
| 1st fraction (50 ml.) | 9.9 | 1.90 |
| 2nd fraction (50 ml.) | 10.0 | 2.30 |
| 3rd fraction (50 ml.) | 10.1 | 2.40 |

The above results show, without any doubt, that triethylamine was released from its hydrochlorides by the calcium stearate.

EXAMPLE II

Different samples of trichloroethylene containing 0.02% of triethylamine were tested for stability in a pH recording apparatus in the presence of different stabilizers.

The pH apparatus consisted of a 500 ml. flask with a standard taper joint, a reflux condenser, and a glass water trap located between the flask and the condenser. In operation there was a layer of water on top of a layer of trichloroethylene in the trap. Two pH electrodes were dipped into this layer of water and were connected to a recorder. The trichloroethylene was boiled in the flask and the condensate flowed continuously through the water layer so that changes in the pH of the trichloroethylene were passed on to the water layer and a continuous record was thus made of the pH of the condensed trichloroethylene. In order to accelerate the decomposition of the solvent so that its failure could be observed within a reasonable period of time, the samples were exposed to ultraviolet light and oxygen was bubbled through the liquid. Usually, the pH started off on the alkaline side and steadily decreased to a value of about 7.0 after which it dropped quickly to a value of about 5.0, after which it then decreased much more slowly.

In a degreaser when the pH of trichloroethylene reaches 7.0, its condition is usually regarded as critical, and if the pH reaches 5.0, the situation is serious. In the above example, therefore, the time to reach a pH of 7.0 and 5.0 was recorded as a measure of the life or stability of a given solvent.

Table II

EFFECT OF METAL SALTS OF WEAK ORGANIC ACIDS ON THE STABILITY OF TRICHLOROETHYLENE CONTAINING 0.0025% BY WEIGHT OF TRIETHYLAMINE

| Percent wt. | Salts Species | Time to reach pH 7.0, hours | pH 5.0, hours |
| --- | --- | --- | --- |
| | None | 0.8–1.2 | 0.8–1.3 |
| 0.04 | Calcium Stearate | 8.5 | 8.8 |
| 0.04 | Magnesium Stearate | 4.0 | 4.2 |
| 0.04 | Zinc Stearate | 1.8 | 2.0 |
| 0.02 | Sodium Stearate | 6.5 | 6.6 |
| 0.05 | Potassium Oleate | 15.8 | 16.0 |
| 0.10 | Basic Lead Stearate | 4.1 | 5.0 |

According to the results shown in Table II, the use of metal salts of weak organic acids improves greatly the stability of trichloroethylene already containing a low-boiling amine.

EXAMPLE III

Stability tests were conducted in the recording pH apparatus described in Example II on 200 ml. samples of trichloroethylene containing a cutting oil and 0.02% of dimethylhydrazine.

The results and the conditions under which the different tests took place are summarized in the following table.

Table III

| Stabilizers | | Cutting Oil "Sultan A" Wt. percent | Time to reach | |
| --- | --- | --- | --- | --- |
| 1,1-dimethylhydrazine Wt. percent | Zinc naphthenate Wt. percent | | pH 7.0, hours | pH 5.0, hours |
| 0.02 | 0 | 3.1 | 5.5 | 6.8 |
| 0.02 | 0 | 3.1 | 7.3 | 8.5 |
| 0.02 | 0.10 | 3.1 | 27.3 | 33.5 |
| 0.02 | 0.10 | 3.1 | 41.8 | |

The above results show that any low-boiling base may be used in combination with a metal salt of a weak organic acid to improve the stability of trichloroethylene.

Although the aforesaid examples have only been described in connection with trichloroethylene, it is to be understood that any other degreasing solvent behaves similarly.

What we claim is:

1. A method of stabilizing trichloroethylene against the formation of acidic products therein which comprises incorporating therewith 0.0001–0.1% by weight of triethylamine and 0.01–1.0% by weight of metal salt of a weak organic acid selected from the group consisting of calcium stearate, magnesium stearate, zinc stearate, sodium stearate, potassium oleate and basic lead stearate.

2. A composition of matter comprising trichloroethylene in admixture with 0.0001–0.1% by weight of triethylamine and 0.01–1.0% by weight of a metal salt of a weak organic acid selected from the group consisting of calcium stearate, magnesium stearate, zinc stearate, sodium stearate, potassium oleate and basic lead stearate.

3. A method of stabilizing trichloroethylene against the formation of acidic products therein which comprises incorporating therewith 0.0001–0.1% by weight of triethylamine and 0.01–1.0% by weight of calcium stearate.

4. A composition of matter comprising trichloroethylene in admixture with 0.001–0.1% by weight of triethylamine and 0.01–1.0% by weight of calcium stearate.

References Cited in the file of this patent

UNITED STATES PATENTS

| 2,043,257 | Missbach | June 9, 1936 |

FOREIGN PATENTS

| 391,156 | Great Britain | Apr. 18, 1933 |
| 545,500 | Great Britain | May 29, 1942 |
| 35,060 | France | June 18, 1929 |
| | (1st addition to French Patent 649,934) | |